United States Patent
Freisinger et al.

(10) Patent No.: US 6,729,120 B2
(45) Date of Patent: May 4, 2004

(54) METHOD FOR OPERATING AN INTERNAL COMBUSTION ENGINE OF A MOTOR VEHICLE

(75) Inventors: Normann Freisinger, Lorch (DE); Roland Kemmler, Stuttgart (DE); Manfred Treusch, Freiberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/319,816

(22) Filed: Dec. 16, 2002

(65) Prior Publication Data

US 2003/0131589 A1 Jul. 17, 2003

(30) Foreign Application Priority Data

Dec. 15, 2001 (DE) .......................................... 101 61 850

(51) Int. Cl.[7] ................................................. F01N 3/00
(52) U.S. Cl. .............................. 60/274; 60/285; 60/300; 123/198 F
(58) Field of Search .................... 60/274, 276, 277, 60/285, 300; 123/198 F, 481; 180/65.2, 65.4; 477/174, 181

(56) References Cited

U.S. PATENT DOCUMENTS

| | | | | | |
|---|---|---|---|---|---|
| 4,463,717 A | * | 8/1984 | Ueno | ...................... | 123/198 F |
| 5,414,994 A | * | 5/1995 | Cullen et al. | .................. | 60/274 |
| 5,586,432 A | * | 12/1996 | Huemer et al. | ................ | 60/274 |
| 5,785,138 A | * | 7/1998 | Yoshida | ...................... | 180/65.2 |
| 6,112,518 A | * | 9/2000 | Jerger et al. | ................... | 60/274 |
| 6,371,889 B1 | * | 4/2002 | Kuroda et al. | .............. | 477/181 |

FOREIGN PATENT DOCUMENTS

| | | |
|---|---|---|
| DE | 19517434 | 11/1996 |
| DE | 10212357 | 10/2002 |

* cited by examiner

Primary Examiner—Thomas Denion
Assistant Examiner—Tu M. Nguyen
(74) Attorney, Agent, or Firm—Crowell & Moring LLP

(57) ABSTRACT

A method for operating an internal combustion engine of a motor vehicle having an engine control unit and an exhaust-gas catalytic converter. In the invention, the engine control unit is used to switch off the internal combustion engine in an idling mode and/or in an overrun mode of the internal combustion engine, depending on the temperature of the exhaust-gas catalytic converter and an exhaust-gas temperature.

14 Claims, 1 Drawing Sheet

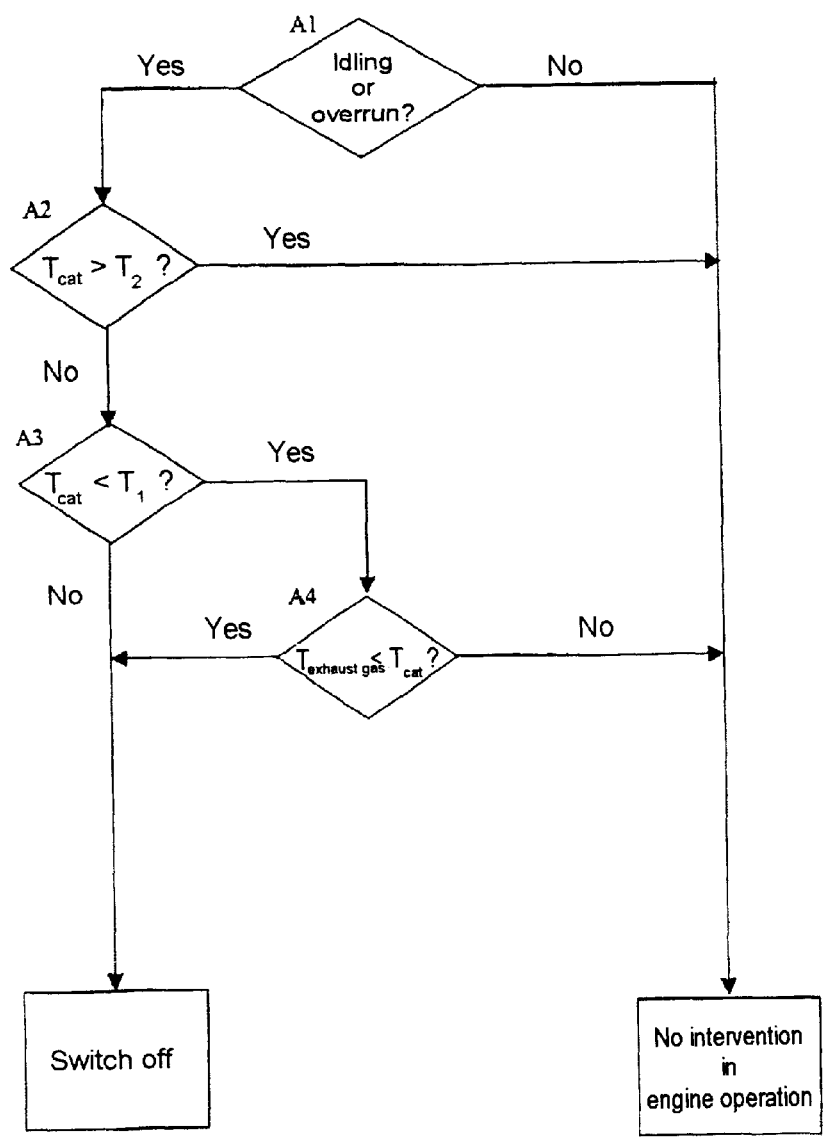

METHOD FOR OPERATING AN INTERNAL COMBUSTION ENGINE OF A MOTOR VEHICLE

BACKGROUND AND SUMMARY OF THE INVENTION

This application claims the priority of German Application No. 101 61 850.6-13, filed Nov. 15, 2001, the disclosure of which is expressly incorporated by reference herein.

The present invention relates to a method for operating an internal combustion engine of a motor vehicle having an engine control unit and an exhaust-gas catalytic converter.

To reduce the fuel consumption and to lower the emission of pollutants in motor vehicles, it is known to automatically switch off the internal combustion engine when the vehicle is temporarily stationary. When the driver of the motor vehicle wants to proceed, the internal combustion engine will be started up again in response to a suitable signal (what is known as automated start stop operation). The automatic switching off and restarting are usually initiated by an engine control unit which also determines that the vehicle is stationary and that the driver wishes to proceed. In this way, the operating time of the internal combustion engine is reduced, and therefore the fuel consumption and the emission of pollutants from the motor vehicle are also reduced.

It is an object of the present invention to provide a method for operating an internal combustion engine of a motor vehicle in which the emission of pollutants from the motor vehicle is still further reduced in combination with the lowest possible fuel consumption.

The method according to the invention is distinguished by using an engine control unit to switch off the internal combustion engine in an idling mode and/or overrun mode as a function of the temperature of an exhaust-gas catalytic converter. The decision as to whether to switch off the internal combustion engine during idling and during an overrun mode is accordingly made as a function of the current temperature of the exhaust gas and the current temperature of the exhaust-gas catalytic converter. This avoids switching off the internal combustion engine at a time which is unfavourable for operation of the exhaust-gas catalytic converter. For example, after a short journey following a cold start of the motor vehicle, the exhaust-gas catalytic converter is generally not yet at operating temperature, whereas the internal combustion engine is already providing significantly heated exhaust gas. If, at such a time, the vehicle comes to a standstill and the internal combustion engine is switched off, the further heating of the exhaust gas catalytic converter is delayed, so that it continues to be unable to function fully and consequently cannot purify or cannot sufficiently purify the exhaust gas after the internal combustion engine has been started up again and the trip has once again commenced. Therefore, in the operating method described above, it is advantageous for the overall emission of the pollutants from the motor vehicle if the internal combustion engine is switched off in idling mode while the vehicle is stationary only as a function of the temperature of the exhaust-gas catalytic converter and of the exhaust-gas temperature. Similarly, the emission of pollutants from the motor vehicle is likewise reduced if, when the internal combustion engine is in overrun mode, it is switched off as a function of the temperature of the exhaust gas catalytic converter and of the exhaust-gas temperature.

In one configuration of the invention, the internal combustion engine is switched off in idling and/or overrun mode if the temperature T of the exhaust-gas catalytic converter lies within a range with a predetermined lower limit temperature T1 and a predetermined upper limit temperature T2. It is preferable for the lower limit temperature T1 to be linked to what is known as the light off temperature of the catalytic converter, i.e. the temperature above which a certain minimum conversion of pollutants takes place. The upper limit temperature T2 is preferably determined by the thermal stability limit of the catalytic converter. This on the one hand prevents the catalytic converter from being operated at below its light-off temperature for longer than necessary or more often than necessary. Therefore, this measure improves the overall emission of pollutants from the vehicle. On the other hand, the catalytic converter is prevented from being operated for longer than necessary or more often than necessary at above its thermal stability limit. Therefore, possible damage to the catalytic converter is avoided, and consequently its purification function is retained for a longer time. If there are a plurality of exhaust-gas catalytic converters in the exhaust-gas purification system, it is preferable for limit temperatures to be taken into account for each catalytic converter and for the internal combustion engine only to be switched off if the temperature of each catalytic converter lies within the associated temperature range, i.e. between T1 and T2.

In a further configuration of the invention, the internal combustion engine is switched off in idling and/or overrun mode if the temperature of the exhaust-gas catalytic converter lies below a predetermined lower limit temperature T1 and, at the same time, the temperature of the exhaust gas flowing into the exhaust-gas catalytic converter is less than or equal to the temperature of the exhaust-gas catalytic converter. This measure prevents the exhaust-gas catalytic converter being cooled further by the exhaust gas, so that it loses efficiency as a result. Therefore, it is preferable for the limit temperature T1 to be selected to be approximately equal to the light off temperature of the corresponding catalytic converter.

In a further configuration of the invention, the internal combustion engine is switched off in idling and/or overrun mode if the temperature of the exhaust-gas catalytic converter lies above a predetermined upper limit temperature T2. It is preferable for this second limit temperature T2 to lie in the region of the thermal stability limit of the catalytic converter. Since in idling or overrun mode exhaust gas which is at a relatively low temperature is supplied by the internal combustion engine, in this case the exhaust gas cools the greatly heated catalytic converter and therefore prevents it from becoming damaged. The situation which has been outlined may, in practical driving conditions, occur, for example, if, following full-load operation with considerable heating of the catalytic converter, the vehicle temporarily comes to a standstill. Since, according to the invention, in this situation the internal combustion engine is not switched off, the catalytic converter is cooled again relatively quickly by the exhaust gas in idling mode, which is only heated to a relatively minor extent. Therefore, the inventive measure means that the catalytic converter is exposed to a lower thermal load, and therefore the natural aging process slows.

In a further configuration of the invention, the internal combustion engine is not switched off in idling and/or overrun mode if the temperature of the exhaust-gas catalytic converter lies below a predetermined lower limit temperature T1 and, at the same time, the temperature of the exhaust gas flowing into the exhaust gas catalytic converter is higher than the temperature of the exhaust-gas catalytic converter.

It is preferable for the lower limit temperature T1 to be selected to be approximately equal to the light-off temperature of the corresponding catalytic converter, and consequently the result of this measure is that the catalytic converter reaches its active temperature range as a result of the heating effected by the exhaust gas and can then perform its exhaust-gas purification function.

In a further configuration of the method according to the invention, the internal combustion engine is switched off in idling and/or overrun mode only after a predetermined waiting time after the engine control unit has determined that the engine should, in principle, be switched off according to the conditions cited above. The waiting may, for example, be 5 seconds, which prevents the internal combustion engine from being switched off and started up again repeatedly as a result of driving and standstill conditions following one another in very close succession, which would lead to increased wear to the starter device.

Other objects, advantages and novel features of the present invention will become apparent from the following detailed description of the invention when considered in conjunction with the accompanying drawing.

BRIEF DESCRIPTION OF THE DRAWINGS

The single FIGURE is a flow diagram illustrating the present invention.

DETAILED DESCRIPTION OF THE PREFERRED EMBODIMENT

The sole FIGURE shows a flow diagram for the method according to the invention which can be used, for example, in a motor vehicle with spark-ignition engine and an exhaust-gas purification installation with a starting catalytic converter arranged close to the engine. The motor vehicle is equipped with an engine control unit which carries out the interrogations shown in the flow diagram, in order to read the appropriate signals and react by emitting control signals. A conventional electronic engine control unit which controls engine operation with the aid of suitable control signals receives a large number of input signals can be used to do this. These input signals relate to the parameters which are relevant to engine operation, such as air throughput, fuel throughput, engine load, engine speed, fuel injection parameters and the like. These input signals also include variables which characterize the state of the exhaust-gas purification system. To determine the catalytic converter temperature, a temperature sensor is fitted to the catalytic converter. A further temperature sensor is arranged in the exhaust system in such a way that the entry temperature of the exhaust gas into the catalytic converter can be determined as reliably as possible. The measured values from the temperature sensor are transmitted to the engine control unit, where they are suitably evaluated. Motor vehicles equipped in this way are in widespread use, and consequently the arrangement of the hardware components used is not illustrated. After the engine has been started, the engine control unit cyclically interrogates the state of the engine operation and the temperatures of the exhaust gas and the catalytic converter in accordance with the flow diagram shown in the FIGURE.

In a first step A1 a determination is made as to whether the engine is in idling or overrun mode. If not, there is no intervention to the standard operation of the engine, and the determination is repeated after a predetermined cycle time of, for example, 0.5 second has elapsed. If it is determined that the idling mode or overrun mode is present, the catalytic-converter temperature is then interrogated at A2.

If the result of question A2 relating to the catalytic converter temperature reveals that the latter is greater than or equal to a predetermined limit temperature T2, a signal is sent that the catalytic converter should be cooled, and consequently there is likewise no intervention in standard engine operation. Therefore, the catalytic converter continues to be supplied with exhaust gas which is at a relatively low temperature, since the engine is not performing any significant work. Therefore, the catalytic converter is cooled. The predetermined limit temperature T2 is a temperature which corresponds to the stability limit of the catalytic converter or, for safety reasons, is slightly lower than this limit. Depending on the catalytic converter, this limit temperature T2 is typically in the range from approximately 800° C. to If the catalytic converter temperature is below the limit value T2, a further question A3 asks whether the catalytic converter temperature is instead below a lower limit value T1. The limit temperature T1 selected is preferably the light-off temperature of the catalytic converter, which is typically between 150° C. and 250° C. If not, this means that the catalytic converter is in a standard operating state and the engine is switched off in order to save fuel consumption, if appropriate after a certain waiting time.

If question A3 shows that the catalytic-converter temperature is below the lower limit value T1, a further question A4 asks whether the entry temperature of the exhaust gas is lower than the temperature of the catalytic converter. If so, this means that the catalytic converter, which is already undesirably cold, is being cooled further by the exhaust gas. Therefore, the engine of the vehicle is switched off in order to prevent further cooling of the catalytic converter. On the other hand, if the temperature of the exhaust gas is higher than the catalytic-converter temperature, no intervention is performed in standard engine operation, i.e. the engine is not switched off. The catalytic converter can be heated more quickly to a valve above its light-off temperature T1 as a result of hotter exhaust gas being applied, and can therefore satisfy its purification function more quickly.

If the result of the interrogation procedure is that the engine is switched off, the fuel supply to the cylinders of the engine is ended by closing the injection valves, if appropriate after a certain waiting time of, for example, five seconds, and, in the case of a spark-ignition engine, the ignition is switched off. In addition, a throttle valve which is present in the intake section of the engine, can be closed. Furthermore, the drive train can additionally be decoupled from the engine. If servo systems which are dependent on the engine operation, such as for example a brake booster or power-assisted steering, are present, the availability of these systems can continue to be ensured by the use of on-board electric power.

The vehicle is restarted when the driver of the motor vehicle actuates an operating element in the vehicle. This may take place, for example, through actuation of a dedicated signaling means or through release of the brake pedal which has previously been actuated, or in some other way.

In terms of the exhaust-gas purification, the method described can be referred to as an intelligent automated start-stop arrangement. It will be understood that the method can be used for motor vehicles which are equipped with any desired type of internal combustion engine. Furthermore, the method can be used for exhaust-gas purification systems which have a plurality, and in particular different types, of catalytic converters. The questions concerning the exhaust-gas temperature and/or the catalytic converter temperature can then be applied variably to different catalytic converters. It is then possible to interrogate a plurality of exhaust-gas temperatures and/or catalytic-converter temperatures in order, for example, to ensure that the internal combustion engine is switched off if, on the basis of the method sequence outlined above, the switching off criterion is satisfied for one of these catalytic converters. Of course, this also applies in the same way to the decision not to switch off the internal combustion engine. Furthermore, it is not necessarily the case that there is a temperature sensor for determining each of the temperatures. Rather, exhaust-gas temperatures and/or catalytic-converter temperatures can also be determined from suitable calculation models which are stored, for example, in a memory in the engine control unit. The models may work on the basis of the available technology. For example, they may be based on the respective engine operation parameters, such as for example load and engine speed or other variables.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling on/off operation of an internal combustion engine, comprising the steps of:
   determining a temperature of an exhaust-gas catalytic converter;
   determining an exhaust-gas temperature of said internal combustion engine; and
   switching off said internal combustion engine as a function of both the temperature of the exhaust catalytic converter and the exhaust-gas temperature.

2. The method according to claim 1, wherein said internal combustion engine is switched off by an output from an engine control unit.

3. The method according to claim 1, wherein the internal combustion engine is switched off when the temperature of the exhaust-gas catalytic converter is greater than a first predetermined value and less than a second predetermined value.

4. The method according to claim 1, wherein the internal combustion engine is switched off when both the temperature of the exhaust-gas catalytic converter is less than a first predetermined value and the temperature of the exhaust-gas flowing into the converter is no greater than the temperature of the exhaust-gas catalytic converter.

5. The method according to claim 1, wherein the internal combustion engine remains operational when the temperature of the exhaust-gas catalytic converter is above a predetermined value.

6. The method according to claim 1, wherein the internal combustion engine remains operational when the temperature of the exhaust-gas catalytic converter is below a predetermined lower limit temperature T, and the temperature of the exhaust gas flowing into the exhaust-gas catalytic converter is higher than the temperature of the exhaust-gas catalytic converter.

7. A method for operating an internal combustion engine of a motor vehicle having an engine control unit and an exhaust-gas catalytic converter, said method comprising the steps of:
   determining a temperature of the exhaust-gas catalytic converter;
   determining an exhaust-gas temperature; and
   switching off by means of said engine control unit, the internal combustion engine during at least one of an idling mode and an overrun mode of the internal combustion engine as a function of both the temperature of the exhaust-gas catalytic converter and the exhaust-gas temperature.

8. The method according to claim 7, wherein the internal combustion engine is switched off when the temperature T of the exhaust-gas catalytic converter lies within a range have a predetermined lower limit temperature T1 and a predetermined upper limit temperature T2.

9. The method according to claim 8, the engine is switched off after a predetermined waiting time.

10. The method according to claim 7, wherein the internal combustion engine is switched off when the temperature of the exhaust-gas catalytic converter lies below a predetermined lower limit temperature T1 and, at the same time, the temperature of the exhaust gas flowing into the exhaust-gas catalytic converter is less than or equal to the temperature of the exhaust-gas catalytic converter.

11. The method according to claim 10, the engine is switched off after a predetermined waiting time.

12. The method according to claim 7, wherein the internal combustion engine is not switched off if the temperature of the exhaust-gas catalytic converter is above a predetermined upper limit temperature T2.

13. The method according to claim 7, wherein the internal combustion engine is not switched off if the temperature of the exhaust-gas catalytic converter is below a predetermined lower limit temperature T1 and, at the same time, the temperature of the exhaust gas flowing into the exhaust-gas catalytic converter is higher than the temperature of the exhaust-gas catalytic converter.

14. The method according to claim 7, the engine is switched off after a predetermined waiting time.

* * * * *